(12) United States Patent
Kuo

(10) Patent No.: US 7,613,006 B2
(45) Date of Patent: Nov. 3, 2009

(54) ELECTRONIC DEVICE INSTALLATION STRUCTURE

(75) Inventor: Yi-Ting Kuo, Taipei (TW)

(73) Assignee: Shuttle Inc., Taipei (TW)

( * ) Notice: Subject to any disclaimer, the term of this patent is extended or adjusted under 35 U.S.C. 154(b) by 438 days.

(21) Appl. No.: 11/584,522

(22) Filed: Oct. 23, 2006

(65) Prior Publication Data

US 2008/0094809 A1 Apr. 24, 2008

(51) Int. Cl.
*H05K 7/14* (2006.01)
(52) U.S. Cl. .................. 361/756; 361/741; 361/802; 361/679.41; 361/730; 174/520
(58) Field of Classification Search .................. 361/732, 361/740, 686, 685, 679.33, 679.37, 679.41, 361/747, 759, 730; 174/520
See application file for complete search history.

(56) References Cited

U.S. PATENT DOCUMENTS 5,218,662 A * 6/1993 Dugan ................... 385/123
6,570,755 B2 * 5/2003 Curlee et al. ........... 361/679.58
6,665,178 B2 * 12/2003 Curlee et al. ........... 361/679.48
6,711,001 B2 * 3/2004 Hernandez et al. ......... 361/727

FOREIGN PATENT DOCUMENTS

TW 572323 1/2004

* cited by examiner

*Primary Examiner*—Dameon E Levi
(74) *Attorney, Agent, or Firm*—Chun-Ming Shih

(57) ABSTRACT

An electronic device installation structure for housing an electronic device which is coupled with a signal transmission dock includes a chassis which has a housing trough to hold the electronic device. The housing trough and the electronic device have respectively a guiding track and a boss that correspond to each other. The guiding track has an inlet and a distal end that jointly define a moving displacement of the boss. The boss can be moved along the guiding track to allow the electronic device to be steadily and fully loaded into the housing trough. The electronic device and the housing trough form an interval between them in the fully loaded condition that is proximate to the thickness of the signal transmission dock so that a secure electric connection is established between the signal transmission dock and the electronic device.

12 Claims, 4 Drawing Sheets

ELECTRONIC DEVICE INSTALLATION STRUCTURE

FIELD OF THE INVENTION

The present invention relates to an electronic device installation structure and particularly to an installation structure to facilitate electric connection of a signal transmission dock and an electronic device.

BACKGROUND OF THE INVENTION

The conventional installation structure for electronic devices (e.g. hard disk drives) such as the one disclosed in R.O.C. patent publication No. 572323 entitled "Improved structure for hard disk boxes" mainly includes a chassis, a hard disk box and an upper lid. The hard disk box contains a hard disk and has air vents on the bottom to disperse heat. There is a socket on the rear side to facilitate connection and positioning of the hard disk. The socket is fastened through a steel plate and a screw from the outer side. The socket further has a power supply socket on one side that has a flat cable to provide electric power for operation of the hard disk drive and a connector on another side with another flat cable to connect to the hard disk drive. The hard disk box is housed in the chassis which has a radiation fan on a rear side. The chassis further has a socket in the center connecting electrically to the socket on the rear side of the hard disk box. To facilitate positioning of the bard disk in the hard disk box, the hard disk box has screws on the left side and right side, and two sides of the lower portion to fasten the hard disk box.

However the conventional hard disk drive installation structure still leaves a lot to be desired. For instance, the flat cables of the power supply socket and connector are pushed rearwards and squeezed during connection with the hard disk, coupling accuracy suffers and coupling space shrinks. Connection is difficult and takes a lot of time and efforts. And connection terminals are easily skewed and damaged. Assembly and disassembly are more difficult. Installation of the hard disk box requires many screws that have to be aligned precisely with small screw holes for fastening. All this creates a lot of troubles for users.

SUMMARY OF THE INVENTION

The primary object of the present invention is to provide an electronic device installation structure adopted for use on an electronic device (such as a hard disk drive) coupling with a signal transmission dock. The structure has a chassis with a housing trough formed thereon to hold the electronic device. The signal transmission dock can be in contact with the wall of the housing trough to press against the electronic device firmly without skewing. And the transmission line is kept naturally beneath the signal transmission dock without the need of an extra wiring space. Wiring can be done easier, and installation of the electronic device can be performed rapidly.

To achieve the foregoing object, the structure of the invention includes a chassis that has a housing trough and an electronic device held in the housing trough. The housing trough and the electronic device have respectively a guiding track and a boss that mate each other. The guiding track has an inlet and a distal end to define a moving displacement of the boss so that the electronic device can be loaded into the housing trough along the moving displacement through the boss. After the electronic device is fully loaded into the housing trough, an interval is formed between the electronic device and the housing trough that is proximate to the thickness of the signal transmission dock. Hence while the electronic device is held in the housing trough the signal transmission dock is in contact with the wall of the housing trough to ensure that an electric connection is securely established between the signal transmission dock and the electronic device.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
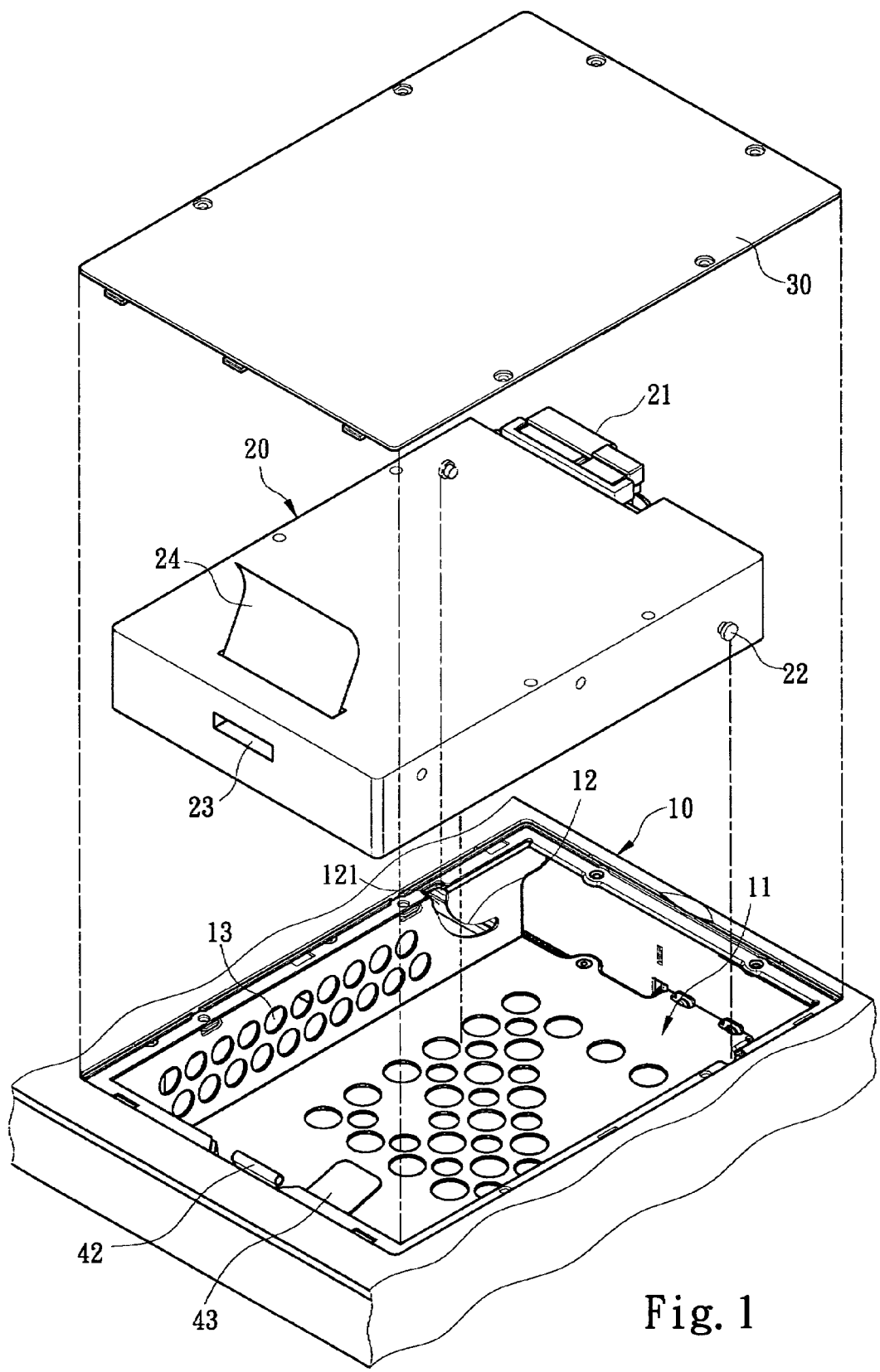
FIG. 1 is a schematic view of an embodiment of the invention.
Figure 2:
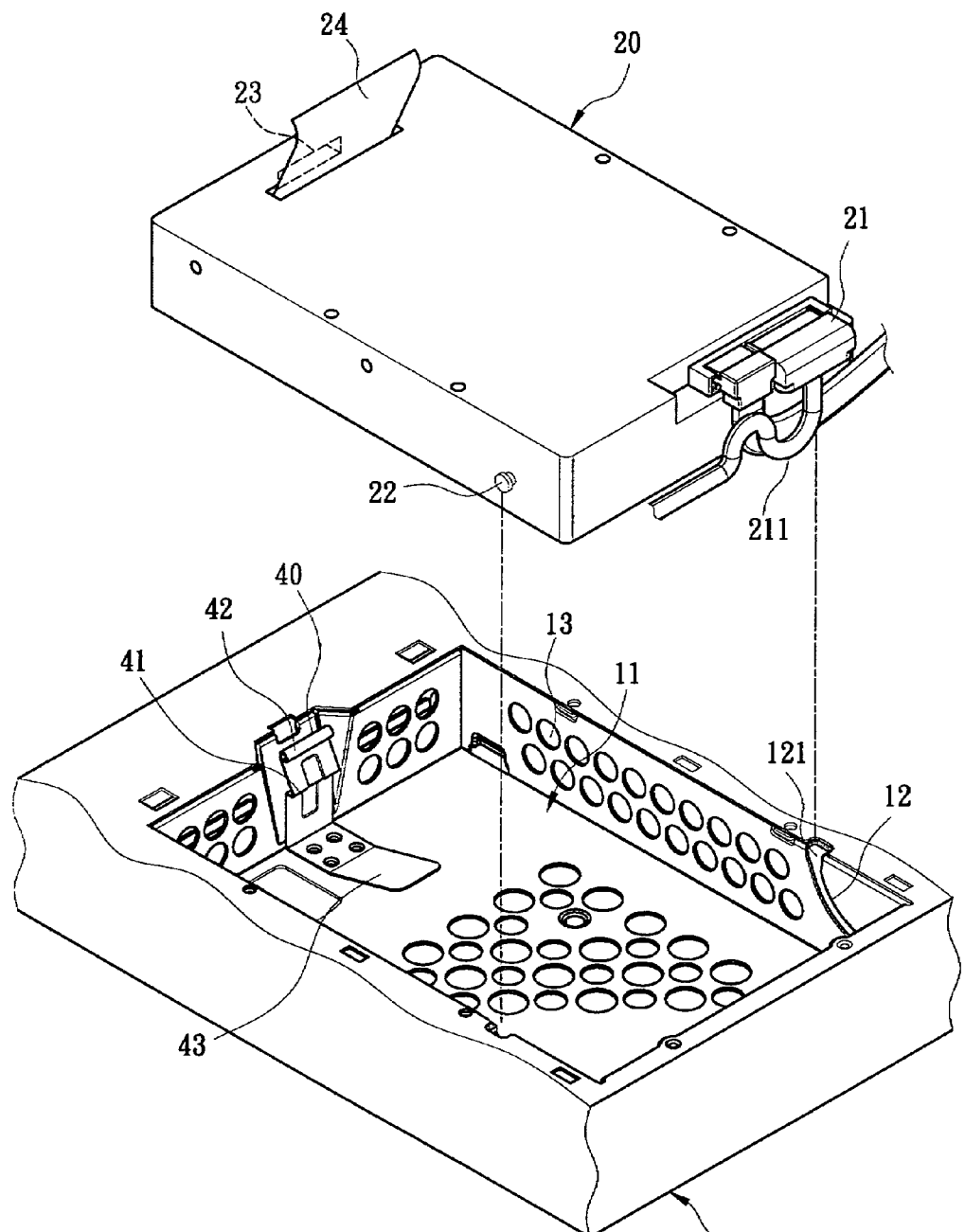
FIG. 2 is another schematic view of an embodiment of the invention.

Please refer to FIGS. 1 and 2 for an embodiment of the invention. The electronic device installation structure of the invention aims to hold an electronic device 20 that is coupled with a signal transmission dock 21. The signal transmission dock 21 is connected to a transmission line 211 and may conform to a SATA specification. The electronic device 20 may be a hard disk drive, optical disk drive or the like. In this embodiment the installation structure includes a chassis 10 which has a housing trough 11 to hold the electronic device 20, and a plurality of radiation vents 13 on side walls and the bottom to disperse heat. The housing trough 11 has two side walls each has a guiding track 12 located thereon. The electronic device 20 has a boss 22 on each of two sides thereof corresponding to the guiding track 12 and movable therein (the guiding track 12 and the boss 22 may be formed otherwise). The guiding track 12 is bent and has a curvature and an inlet 121 on an upper end to allow the boss 22 to enter and escape the guiding track 12.

The electronic device 20 and the housing trough 11 further have respectively a retaining cavity 23 and a flexible latch blade 40 on corresponding side walls. The flexible blade 40 has an anchor portion 41 insertable in the retaining cavity 23 to form an anchor condition. The latch blade 40 has a forcing portion 42 movable with the anchor portion 41 to release the anchor condition with the retaining cavity 23. The housing trough 11 has an elastic element 43 on the bottom to press the electronic device 20 in normal conditions. The elastic element 43 may be an elastic reed as shown in the drawings (or a spring or the like that provides similar function). The electronic device 20 also has a force receiving member 24 on an upper side to move the electronic device 20 to escape the housing trough 11. The force receiving member 24 may be a thin plate (mylar plate). After the chassis is covered by an upper lid 30, the thin plate is flatly located on the surface of the electronic device 20 without occupying space.

Figure 3A:
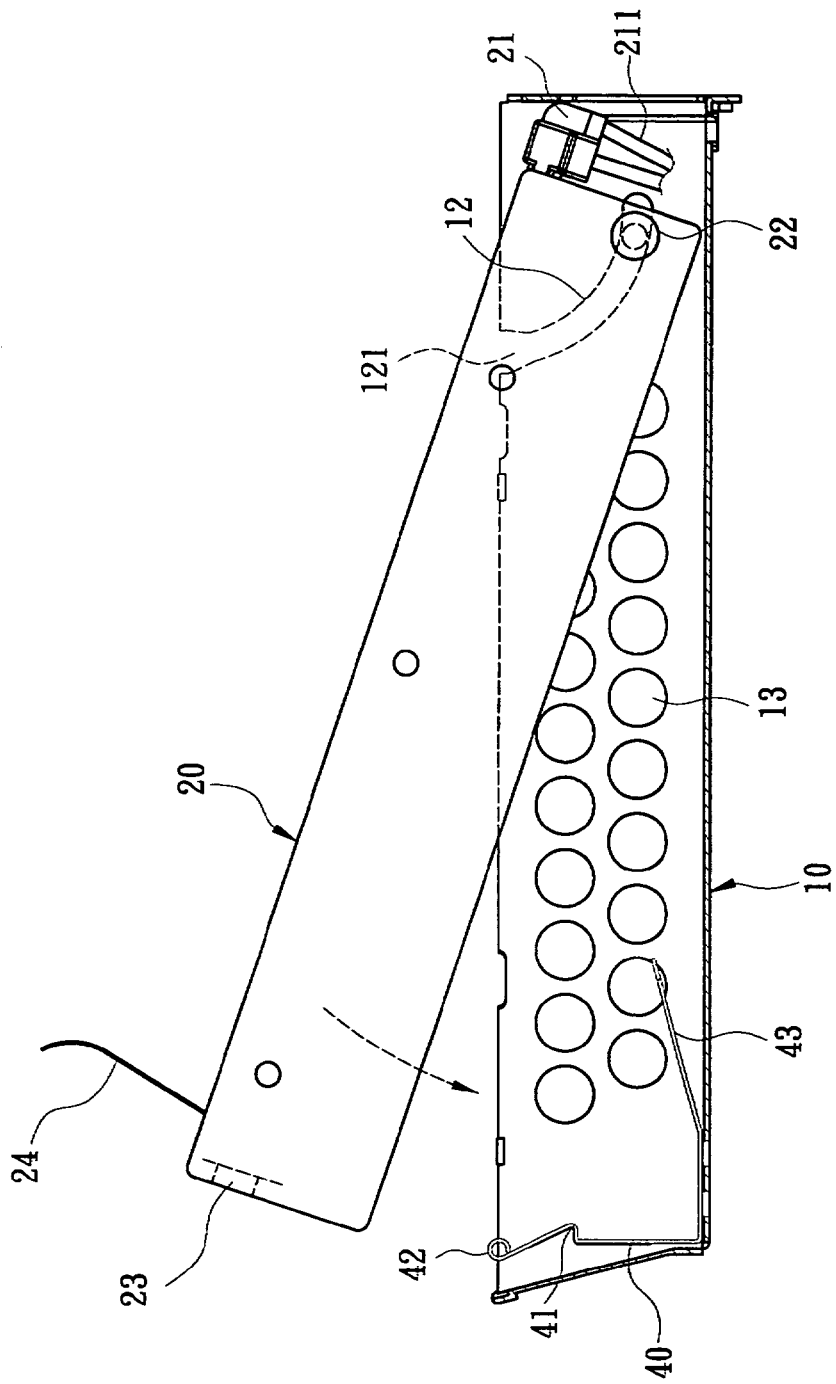
FIGS. 3A and 3B are schematic views of an embodiment of the invention in operating conditions.
Figure 3B:
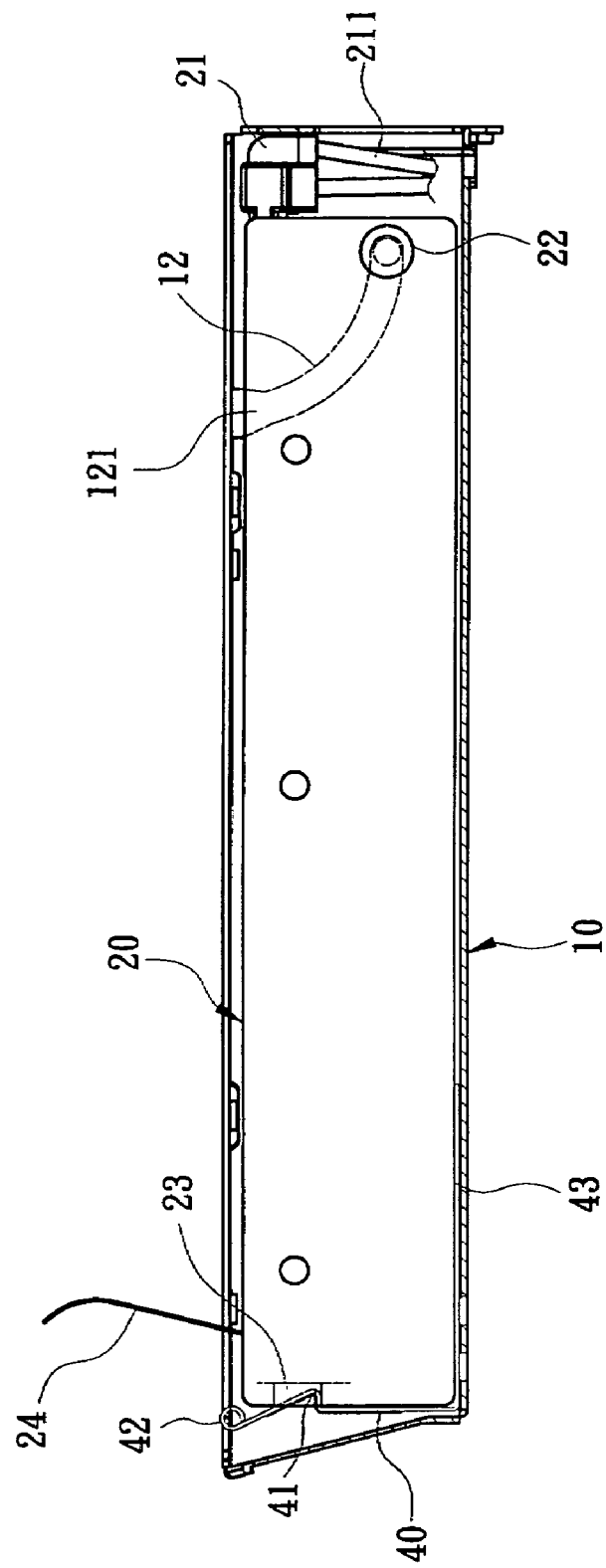

Referring to FIGS. 3A and 3B, when in use and the electronic device 20 is to be installed in the housing trough 11 of the chassis 10, as the guiding track 12 and the boss 22 are corresponding to each other, and the inlet 121 and the distal end of the guiding track 12 define the moving displacement of the boss 22, by aligning the boss 22 on two sides of the electronic device 20 with the inlet 121, the boss 22 can be slipped into the guiding track 12 to load the electronic device 20 steadily along the guiding track 12 into the housing trough 11 (referring to FIG. 3A). Then the rear end of the electronic device 20 where the retaining cavity 23 is formed may be depressed to wedge the anchor portion 41 of the latch blade 40 in the retaining cavity 23. Thus the electronic device 20 can be positioned and held in the housing trough 11 as desired (referring to FIG. 3B). After the electronic device 20 is fully loaded in the housing trough 11, the interval between the electronic device 20 and the housing trough 11 is proximate to the thickness of the signal transmission dock 21. In this embodiment, the boss 22 is located beneath the distal end of the guiding track 12. To enable the signal transmission dock 21 of varying thickness to be fitted in the interval of the electronic device 20 and the housing trough 11, an allowance may be spared on the length of the guiding track 12 so that when the boss 22 is moved to the distal end of the guiding track 12, the interval of the electronic device 20 and the housing trough 11 is equal to or smaller than the thickness of the electronic device 21. Therefore when the electronic device 20 is fully loaded in the housing trough 11 the signal transmission dock 21 can be connected to the inner wall of the housing trough 11 regardless of the thickness thereof so that the signal transmission dock 21 can be securely inserted into the electronic device 20 without skewing to firmly establish electric connection between the two. In addition, the signal transmission line 211 is naturally located beneath the signal transmission dock 21 without the need of allocating an extra wiring space. Thus the wiring problem can be fixed to achieve fast installation of the electronic device 20.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An electronic device installation structure for housing an electronic device which is coupled with a signal transmission dock, comprising:
   a chassis having a housing trough; and
   an electronic device held in the housing trough;
   wherein the housing trough has a guiding track and the electronic device has a boss corresponding to the guiding track, the guiding track having an inlet and a distal end to define a moving displacement of the boss, the electronic device being movable in the housing trough along the moving displacement to be fully loaded in the housing trough such that an interval is formed between the electronic device and the housing trough that is approximate to the thickness of the signal transmission dock to form a secure electric connection between the signal transmission dock and the electronic device.

2. The electronic device installation structure of claim 1, wherein the signal transmission dock conforms to a SATA specification.

3. The electronic device installation structure of claim 1, wherein the guiding track is located on a side wall of the housing trough, the inlet being located on an upper end of the guiding track to allow the boss to escape the guiding track.

4. The electronic device installation structure of claim 1, wherein the boss is located beneath the distal end of the guiding track, the interval of the electronic device and the housing trough being equal to the thickness of the signal transmission dock.

5. The electronic device installation structure of claim 1, wherein the boss is located beneath the distal end of the guiding track, the interval of the electronic device and the housing trough being smaller than the thickness of the signal transmission dock.

6. The electronic device installation structure of claim 1, wherein the guiding track has a bending portion which is formed with a curvature.

7. The electronic device installation structure of claim 1, wherein the electronic device and the housing trough have respectively a retaining cavity and a latch blade on corresponding walls to form an anchoring relationship.

8. The electronic device installation structure of claim 7, wherein the latch blade has an anchor portion to form the anchoring relationship with the retaining cavity.

9. The electronic device installation structure of claim 7, wherein the latch blade is flexible and has a forcing portion on an upper side movable with the anchor portion to release the anchoring relationship with the retaining cavity.

10. The electronic device installation structure of claim 1, wherein the housing trough has an elastic element on the bottom thereof to press the electronic device in normal conditions.

11. The electronic device installation structure of claim 1, wherein the electronic device has a force receiving member on an upper side movable with the electronic device.

12. The electronic device installation structure of claim 11, wherein the force receiving member is a thin plate.

* * * * *